United States Patent [19]
Sokoler et al.

[11] Patent Number: 5,917,842
[45] Date of Patent: Jun. 29, 1999

[54] ERROR-FREE FRAME HANDLING FOR JAMMED DATA FRAMES

[75] Inventors: David Sokoler, Colts Neck; Carlton J. Hunt, Howell, both of N.J.; John E. Montague, Columbia, S.C.

[73] Assignee: NCR Corporation, Dayton, Ohio

[21] Appl. No.: 08/752,010

[22] Filed: Nov. 19, 1996

[51] Int. Cl.⁶ .................................................. H03M 13/00
[52] U.S. Cl. ................................................................. 371/53
[58] Field of Search ................................................. 371/53

[56] References Cited

U.S. PATENT DOCUMENTS 5,251,215  10/1993  Dravida et al. .................... 370/94.1
5,548,598   8/1996  Dupont ................................. 371/53

*Primary Examiner*—Stephen M. Baker
*Attorney, Agent, or Firm*—Ying Tuo

[57] ABSTRACT

In jamming the data field of a data frame being transmitted at a sending end, a CRC error is caused at a receiving end. To instead avoid such CRC error, a section of bits is inserted into the data frame, so that CRC based on the section of bits is forced to a constant bit pattern. From that point on, all the bits transmitted will be jammed to the constant CRC bit pattern. Thus, any appropriate number of bits (assuming it is at least 32 bits) after that section is the correct CRC based on the jammed data frame. Advantageously, after detecting the ending flag of the jammed data frame, the last 32 bits of the jammed data frame will be the correct CRC at a receiving end.

10 Claims, 4 Drawing Sheets

ERROR-FREE FRAME HANDLING FOR JAMMED DATA FRAMES

BACKGROUND OF THE INVENTION

The present invention generally relates to data transmission through a network, and more particularly, to LANs (Local Area Networks) using hubs (or repeaters) to transmit data frames among the hubs and terminals connected to the LANs.

In a typical LAN segment, terminals can be interconnected at the physical layer level with each other via hubs (or repeaters). A hub has a plurality of ports for connecting terminals or other hubs. Each of the terminals or hubs has a unique address assigned to it.

Prior to be transmitted over a LAN, a data stream is divided into a plurality of data frames. A data frame contains several fields, including: destination address field, source address field, data field, and Cyclic Redundancy Checksum (CRC). Each of the fields contains one or more bytes, and a byte contains eight bits.

In compliance with LAN physical layer protocols (e.g.: 802.3 CSMA-CD, 802.5 Token Ring, . . . ), a hub must repeat a data frame received to all other terminals or other hubs connected to the LAN segment, in the same bit length as it has been originally received.

Even though the received data frame is repeated to all other terminals connected to the LAN segment, only the terminal with an address matching the destination address of the data frame should act upon and accept the data frame.

Under some situations, it is desirable for a hub to alter (or "jam") the data field of a data frame received before repeating the data frame. For example, the data field of a data frame received can be jammed to "1010101010101010 . . . ", regardless of its original content.

One such situation is called "intrusion," where a port of a hub is exclusively authorized to connect to a specific terminal, but another terminal is "illegally" connected to that port. Upon detecting that a data frame received is sent from the "illegal" terminal, the hub jams the data frame before repeating it to other terminals or hubs, preventing the "illegal" terminal from intruding the LAN.

Another such situation is called "eavesdropping," where a terminal is configured to act upon and accept all data frames repeated to it, even when the data frames' destination addresses do not match the address assigned to the terminal. To avoid "eavesdropping," a hub jams all data frames received before repeating them to all terminals other than the destined terminal.

Still another such situation is called "configuration learning," where LAN administrator tries to learn hub configuration by transmitting "path learning" frames among hubs that are connected to a LAN segment. A "path learning" frame has a unique destination address (which will not be assigned to any terminals connected to the LAN segment), and a unique data field pattern. From the combination of the unique destination address and data fields, a "learning hub", which receives a "path learning" frame from a specific one of its ports, realizes that the incoming data frame is a "path learning" frame. Based on the source address in the "path learning" frame, the "learning hub" learns that the specific port directly connects to an adjacent hub having the source address contained in the "path learning" frame. Before relaying the "path learning" frame to the next hub, however, the "learning hub" needs to jam the "path learning" frame, so that the next hub will not mis-learn that the hub having the source address contained in the "path learning" frame is directly connected to one of its ports.

Even though data frame jamming is desirable in some situations, it can cause CRC errors at terminals or hubs that receive the jammed data frames. This is so because the CRC of a data frame is first generated at the originating station (terminal or hub) based on bit pattern in the data frame as originally sent. Then the CRC for the data frame is re-generated at a receiving terminal or receiving hub based on bit pattern that has been altered. As a result, the re-generated CRC at the receiving terminal or receiving hub is not the same with the CRC at the repeating hub.

Such unintended CRC errors will cause disruptions to network administrations, and, even worse, cause customer panics and dissatisfactions.

Therefore, there is a need to provide a method and an apparatus to alter the contents of data fields in data frames, if needed, without causing CRC errors.

SUMMARY OF THE INVENTION

In one aspect, the present invention provides a method for transmitting a data frame. The data frame contains a plurality of information bits, and an error checking section generated based on the information bits and attached at the end of the information bits. The method comprising the steps of:

(a) determining whether alterations are needed to the information bits;

(b) if alterations are needed, subsequent to a particular bit of the information bits, altering a section of the information bits such that subsequent error checking section is forced into a constant bit pattern; and (c) altering remaining information bits subsequent to said altered section of the information bits into said constant bit pattern.

In another aspect, the present invention provides an apparatus for transmitting a data frame. The data frame contains a plurality of information bits, and an error checking section generated based on the information bits and attached at the end of the information bits. The apparatus comprising:

(a) a processor logic for determining whether alterations are needed to the information bits;

(b) a first circuit logic for altering a section of the information bits such that subsequent error checking section is forced into a constant bit pattern, if alterations are needed, subsequent to a particular bit of the information bits; and (c) a second circuit logic for altering remaining information bits subsequent to said altered section of the information bits into said constant bit pattern.

BRIEF DESCRIPTION OF THE DRAWING

The features and advantages of this invention will be apparent to those skilled in the art from the following description in conjunction with the appended drawing, in which.

DETAILED DESCRIPTION OF PREFERRED EMBODIMENT

Figure 1:
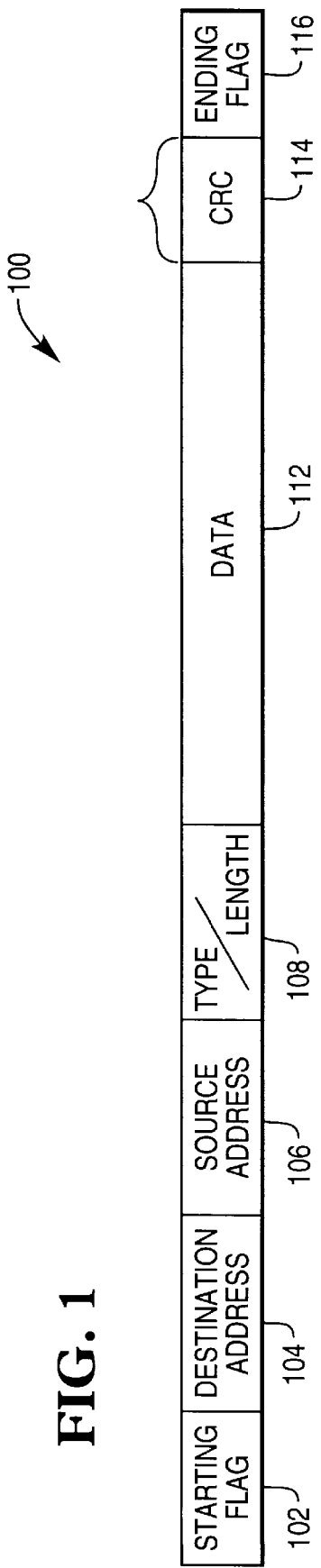
FIG. 1 depicts a data frame 100 to be transmitted.

The following description is presented to enable any person skilled in the art to make and use the invention, and is provided in a context of a particular application and its requirements. Various modifications to the preferred embodiment will be readily apparent to those skilled in the art, and the generic principle defined herein may be applied to other embodiments within the scope and spirit of the invention. Thus, the invention is not intended to be limited to the embodiment shown, but to be accorded the widest scope consistent with the principles and features disclosed herein.

To fully appreciate the present invention, it is helpful to understand that a hub repeats the bits of a data frame in a fashion of bit-received-in-bit-sent-out. Since the hub has to transmit the bits that have been received, while receiving the remaining tailing bits in the data frame, it faces two restraints.

First, during the serial bit-by-bit transmission process, a hub must send every bit it has received with a minimum of delay. It is quit possible that the hub has transmitted out a portion of the data frame before it can make a decision whether to jam the data frame.

Second, during the serial bit-by-bit transmission process, the hub cannot anticipate the position of the last bit of the data frame. The hub only recognizes the end of the data frame by detecting the ending flag in the data frame. By the time the ending flag is detected, some or all of the bits that represent the CRC field of the data frame (114) may have been transmitted.

In principle, the present invention creates a jammed data frame where, in reference of any bit position after certain number of jammed bytes of the jammed data frame, any appropriate number of bits (usually 32 bits) is the correct CRC based on the jammed data frame.

One way to implement this scheme is to jam a data frame with CRC bit pattern adjusted based on the jammed data frame. This approach guarantees that any appropriate number of bits immediately preceding the ending flag of the jammed data frame represents correct CRC.

One advantage of the present invention is that it can simultaneously generate a correct CRC while jamming the data field of a data frame.

More specifically, the present invention replaces a section of bits into a data frame, if and only if jamming is needed, so that CRC after that section of bits is forced to a constant bit pattern. From that point on, all the bits to be transmitted will be jammed to the constant CRC bit pattern. Thus, any appropriate number of bits (assuming it is 32 bits) after that section is the correct CRC. Advantageously, after detecting the ending flag of a jammed data frame, the last 32 bits of the jammed data frame will be the correct CRC. According to the present invention, a the hub does not need to replace the old CRC with a new calculated CRC in jammed data frame.

The principle of the present invention can generate correct CRC for a jammed data frame by using existing CRC algorithms, as shown in equations (1)–(6) (if modulo-2 arithmetic is used):

Let:

$M(x)$=a $k$-bit number (the information bits in a data frame to be transmitted), (1)

$G(x)$=an $(n+1)$-bit number (the divisor or generator), and (2)

$R(x)$=an $n$-bit number such that $k>n$ (the remainder). (3)

Then if:

$(M(x)*2^n)/G(x)=Q(x)+(R(x)/G(x))$, where $Q(x)$ is the quotient, (4)

$(M(x)*2^n+R(x))/G(x)=Q(x)$, assuming modulo-2 arithmetic. (5)

This result can be confirmed by substituting the expression for $M(x)*2^n/G(x)$ into equation (5), giving:

$(M(x)*2^n+R(x))/G(x)=Q(x)+R(x)/G(x)+R(x)/G(x)$ (6)

which is equal to Q(x) since any number added to itself modulo-2 will result zero (that is, the remainder is zero).

To exploit this, the information bits of the data frame M(x) together with an appended set of zeros equal in number of the number of CRC bits to be generated (which is equivalent to multiplying M(x) by $2^n$, where n is the number of CRC bits) are divided modulo-2 by a second binary number G(x), the generator polynomial containing one more bit than CRC. The division operation is equivalent to performing exclusive-OR operation bit-by-bit in parallel as each bit in the data frame is processed. The remainder R(x) is then the CRC which is transmitted at the tail of the information bits in the data frame.

Similarly, on receipt, the received bit stream including CRC bits is again divided by the same general polynomial—that is, $((M(x)*2^n+R(x))/G(x))$. If no errors are present in the transmission, the remainder is all zeros. If an error is present in the transmission, however, the remainder is non-zero.

CRC generation method and circuitry are elaborated in greater detail in Data Communications, Computer Networks and Open Systems, 3d Edition, by Fred Halsall (see pages 106–113). The relevant section (page 106–113) of this book is hereby incorporated into this application by reference.

FIG. 1 depicts an exemplary data frame 100 to be transmitted, including a starting flag field 102, a destination address field 104, a source address field 106, a type/length field 108, a data field 112, a CRC field 114, and an ending flag field 116.

The starting and ending flag fields indicate the beginning and end of the data frame respectively; the destination address field identifies the terminal that will receive the data frame; the source address field identifies the terminal that sends the data frame; the type/length field indicates length or type of the data frame; and the CRC field is calculated based on the content of the information bits of data frame 100. The information bits of data frame 100 are contained in fields 104, 106, 108 and 112.

Figure 2:
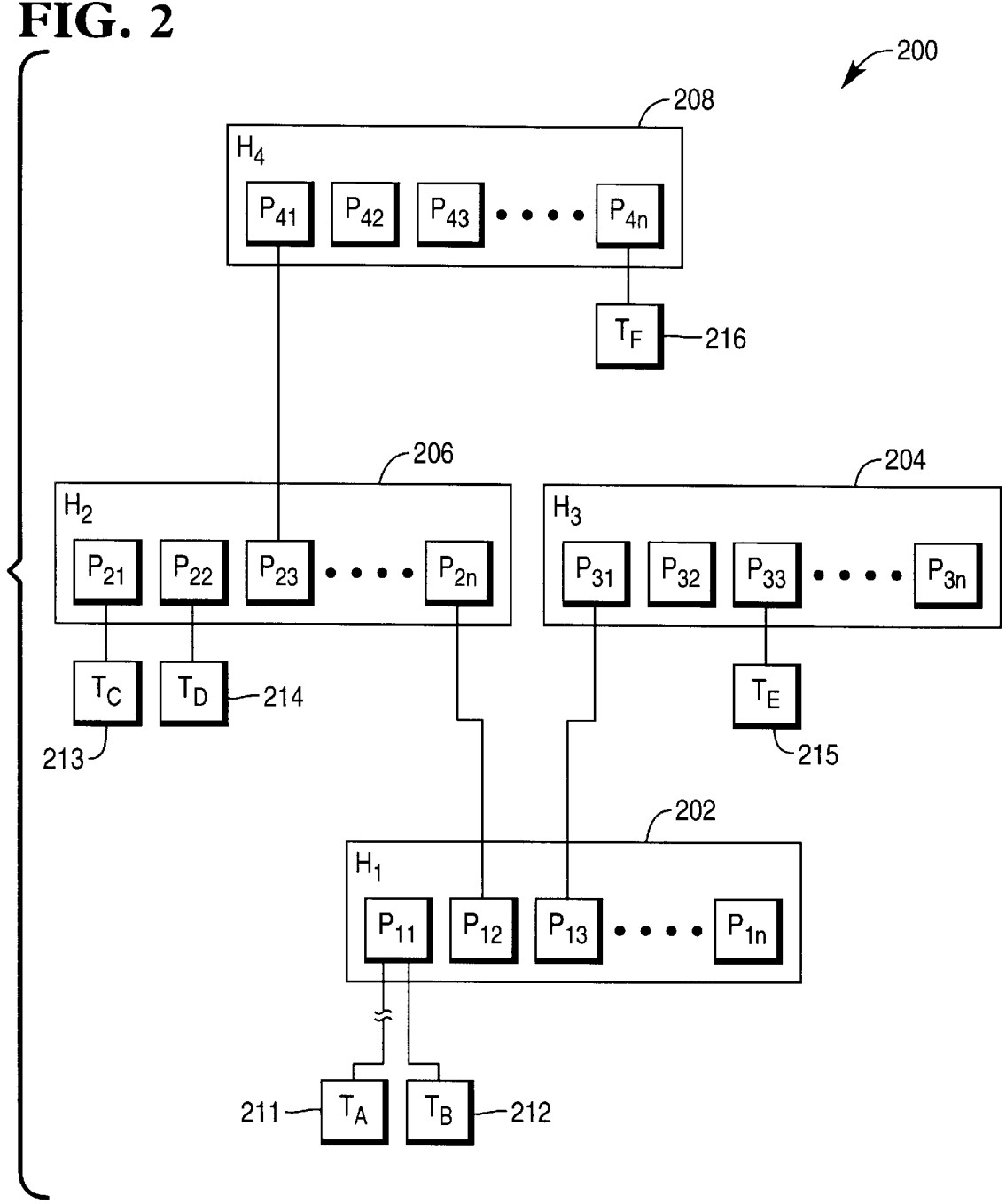
FIG. 2 depicts a LAN segment in accordance with the present invention.

FIG. 2 depicts a LAN segment 200 in accordance with the present invention. The LAN segment includes hub 1 ($H_1$), hub 2 ($H_2$), hub 3 ($H_3$), hub 4 ($H_4$), and six terminals $T_A$–$T_F$ As shown in FIG. 2, each of the four hubs has n ports for connecting terminals or other hubs. Terminal $T_A$ is disconnected from, and terminal $T_B$ is connected to, port $P_{11}$ of $H_1$; terminals $T_C$ and $T_D$ are connected to ports $P_{21}$ and $P_{22}$ of $H_2$, respectively; terminal $T_E$ is connected to port $P_{33}$ of $H_3$; terminal $T_F$ is connected to port $P_{4n}$ of $H_4$.

$H_1$ and $H_2$ are connected to each other via $P_{12}$ and $P_{2n}$; $H_1$ and $H_3$ are connected to each other via $P_{13}$ and $P_{31}$, $H_2$ and $H_4$ are connected to each other via $P_{23}$ and $P_{41}$.

Each of the hubs $H_{1-4}$ shown in FIG. 2 contains hardware and software to check destination address field 104, source address field 106 and data field 112 of a data frame, to determine whether the "intrusion," or "path learning" situation occurs and to prevent "eavesdropping".

More specifically, a hub detects an "intrusion" when the hub recognizes that the source address of a data frame received on a particular port does not match the address of a terminal that has been associated with the particular port; a hub prevents potential "eavesdropping" which occurs when the destination address in a data frame does not match the address of a terminal that has been associated with a particular port; a hub detects a potential "path learning" frame when it receives a data frame containing the unique destination address.

By way of examples, in FIG. 2, "intrusion" detection is demonstrated if port $P_{11}$ is associated with terminal $T_A$ and terminal $T_B$ is "illegally" connected to $P_{11}$, hub $H_1$ will jam data frames from terminal $T_B$ before it repeats them to ports $P_{12}, \ldots, P_{1n}$. "Eavesdropping" prevention is demonstrated if terminal $T_C$ intends to send data frames to terminal $T_D$, hub $H_2$ will repeat data frames without any changes to port $P_{22}$, but will jam the data frames before repeating them to ports $P_{23}, \ldots, P_{2n}$. "Pathlearning" is demonstrated if $H_2$ receives a "path learning" frame from $H_1$, it will jam the frame before repeating the "path learning" frame to $H_4$.

Figure 3:
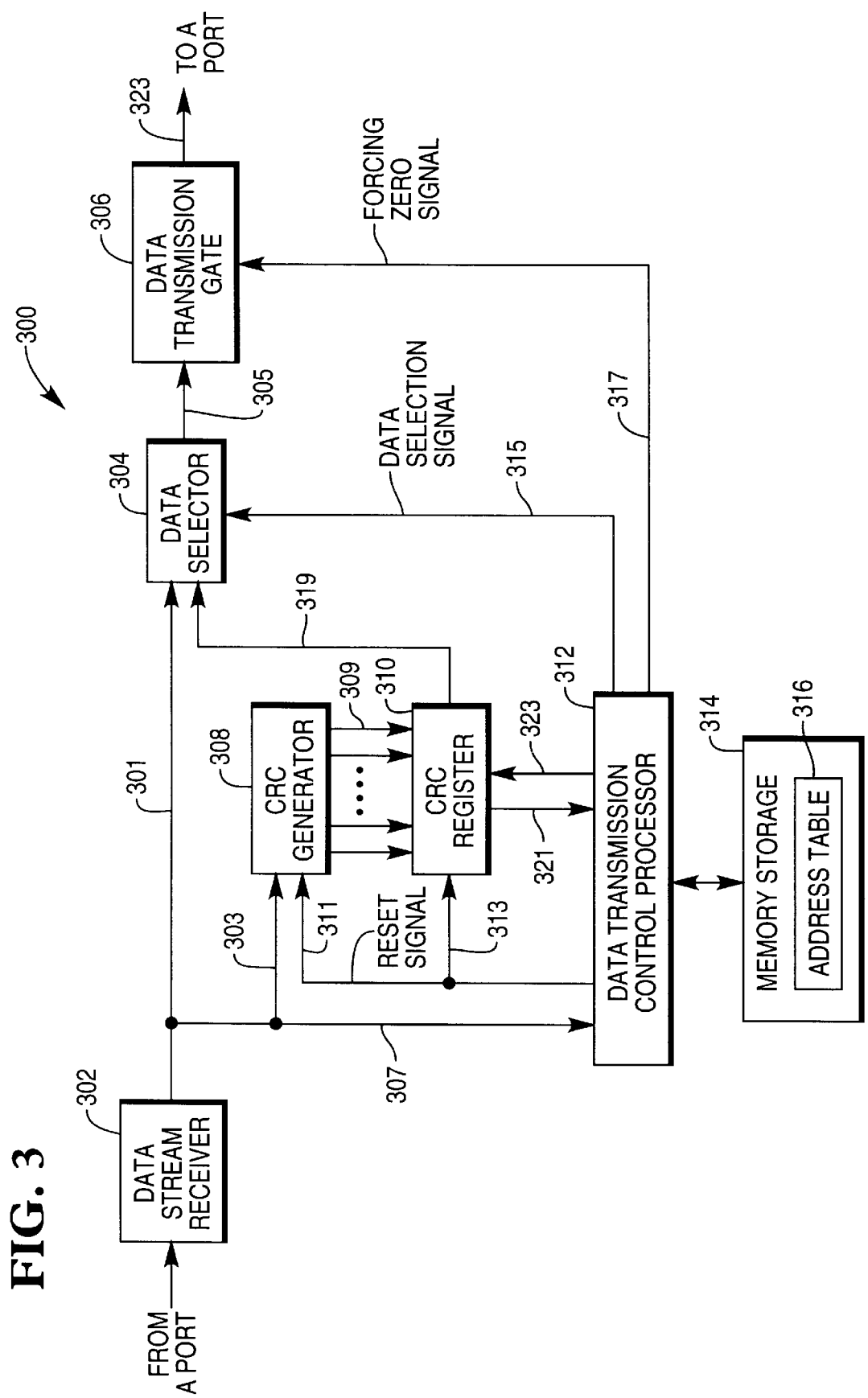
FIG. 3 depicts a block diagram of a data transmission circuitry located within a hub shown in FIG. 2, in accordance with the present invention.

FIG. 3 depicts a block diagram of a data transmission circuitry 300 located within a hub shown in FIG. 2, in accordance with the present invention.

As shown in FIG. 3, data transmission circuitry 300 includes data stream receiver 302, data selector 304, data transmission gate 306, CRC generator 308, CRC register 310, data transmission control processor 312, and memory storage 314.

From a port of the hub, data stream receiver 302 receives a bit stream of a data frame and passes the bit stream in serial sequence to data selector 304, to CRC generator 308, and to data transmission control processor 312, via links 301, 303 and 307 respectively.

CRC generator 308 generates a CRC with receipt of a bit, updates the CRC with receipt of a subsequent bit, and continues to update the CRC until receipt of last information bit of the data frame.

CRC register 310 receives CRC from CRC generator 308 in parallel fashion via links 309, and stores the CRC. Each time when CRC generator 308 updates its CRC, CRC register 310 receives an updated CRC accordingly. When needed, CRC register 310 is able to shift the CRC stored therein in serial sequence to data selector 304.

Under control of data selection signal from data transmission control processor 312, data selector 304 is able to select inputs either from data receiver 302 or CRC register 310.

Under control of forcing zero signal from data transmission processor 312, data transmission gate 306 is able to either pass the bit stream from data selector 304 to output 323 or force output 323 to a constant (all zeros—0s).

Data transmission control processor 312 is able to control overall operation of data transmission circuitry 300. Based on destination address and source address fields of the data frame, data transmission control processor 312 is able to make a decision whether to jam a data frame. If jamming is needed, after the CRC in CRC register 310 has been sent out, data transmission control processor 312 sends forcing zero signal via link 317 to data transmission gate 306, forcing output 323 to zeros (0s). Based on destination address and source address fields of a data frame, data transmission control processor 312 is able to make a decision to switch the input from data stream receiver 302 to CRC register 310, by sending data selection signal to data selector 304 via link 315. Prior to receiving a new data frame, data transmission control processor 312 is also able to reset CRC generator 308 and CRC register 310, by sending reset signal via links 311 and 313, respectively.

Memory storage 314 is able to store programs (including data and instructions), which can be executed by data transmission control processor 312. Memory storage 314 contains a address table 316, which maps all ports of a hub with the addresses of respective terminals connected to the hub ports. Thus, by checking the destination address field of a data frame (for "eavesdropping" and "pathlearning") or the source address field of a data frame (for "intrusion") against the address of a terminal and the number of the port to which the terminal is connected, a hub can make a decision whether jamming is needed.

Figure 4:
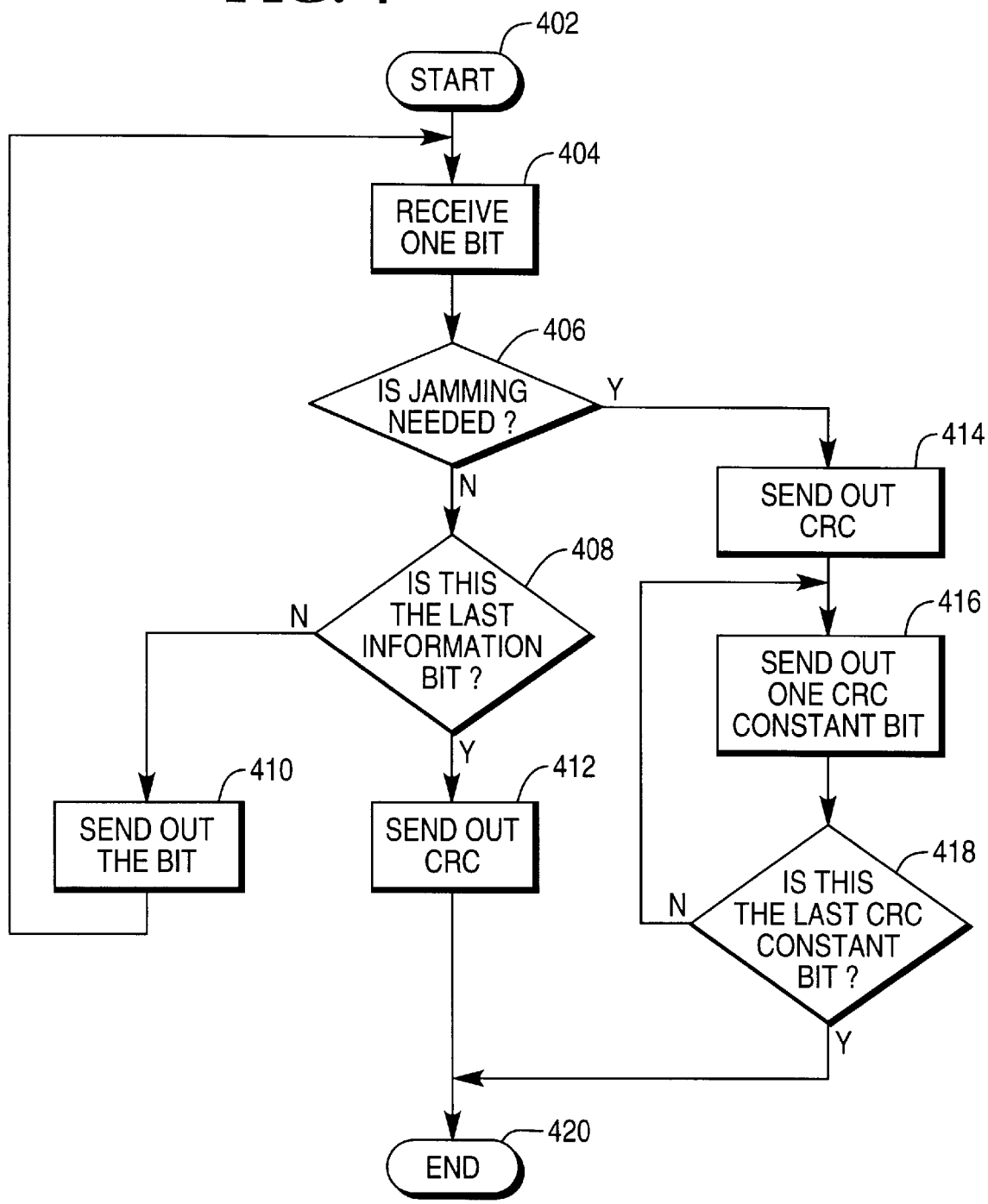
FIG. 4 depicts a flowchart showing the steps of a data frame transmission operation, in accordance with the present invention.

FIG. 4 depicts a flowchart showing the steps of a data frame transmission operation, in accordance with the present invention.

In step 404, data stream receiver 302 receives one bit of a data frame, and passes the bit to data transmission control processor 312.

In step 406, data transmission control processor 312 determines whether jamming is needed. This determination can be made based on the destination address or source address field of the data frame. If the determination is positive, the operation is led to step 414; if the determination is negative, the operation is led to step 407, in which data transmission control processor 312 instructs data selector 304 to select bit input from data stream receiver 302 and sends the one bit to output 323 via data transmission gate 306.

In step 408, data transmission control processor 312 determines whether the bit received is the last bit to be repeated. The determination can be made based on receipt of the ending flag 116 of the data frame. If the determination is negative, the operation is led back to step 404, to receive another bit of the data frame. If the determination is positive, the operation is led to step 412, in which an ending flag is sent to output 323. The operation then ends at 420.

If step 406 determines that the rest of the data frame needs to be jammed, in step 414, data transmission control processor 312 instructs data selector 304 via link 315 to select bit input from CRC register 310. At the same time, data transmission control processor 312 also instructs CRC register 310 via link 323 to shift CRC to data selector 304 via link 319. It should be noted that, since not all information bits of the data frame have been transmitted, the CRC shifted at this time is not real CRC as interpreted by a receiving terminal. However, it is guaranteed, according to equations (1)–(6), that the remainder at the receiving terminal will be zeros (0s) at the last bit of the CRC shifted at this moment. In other words, if the transmitting end sends all zero bits after CRC is shifted out, any appropriate number of bits thereafter is correct CRC at the receiving end.

In step 416, after the CRC has been shifted out, data transmission control processor 306 forces data transmission gate 306 via link 317 to send out a CRC constant bit (e.g. zero bit) to output 323.

In step 418, data transmission control processor 306 determines whether the CRC constant bit is the last CRC constant bit. This determination can be made based on the receipt of the ending flag 116 of the data frame. If the determination is negative, the operation is led back to step 416 to send out another CRC constant bit. If the determination is positive, the operation is led to step 412, in which an ending flag is sent to output 323. The operation then ends at step 420.

Preferably, the program executed by data transmission control processor 312 to perform the steps shown in FIG. 4 is stored in memory storage 314 shown in FIG. 3.

It should be noted that to ensure proper operation at a receiving end, the present invention requires that the bit length of the altered data frame must be no less than the bit length of CRC (usually, CRC is 32 bit long). This requirement is met by 802.3 and 802.5 protocols.

While one particular embodiment of the present invention has been described in detail, it should be understood that the present invention may be implemented through alternative embodiments. Thus, the scope of the present invention is not intended to be limited to the embodiment described above, but is to be defined by the appended claims.

What is claimed is:

1. A method for transmitting a data frame containing a plurality of information bits, the data frame also containing an error checking section generated based on the information bits and attached at the end of the information bits, the method comprising the steps of:
    (a) determining whether alterations are needed to the information bits;
    (b) if alterations are needed, subsequent to a particular bit of the information bits, altering a section of the information bits such that subsequent error checking section is forced into a constant bit pattern; and
    (c) altering remaining information bits subsequent to said altered section of the information bits into said constant bit pattern.

2. The method of claim 1, said data frame containing a destination address field, wherein said step (a) makes the determination based on said destination address field.

3. The method of claim 1, said data frame containing a source address field, wherein said step (a) makes the determination based on said source address field.

4. The method of claim 1, wherein in said step (b), said section of the information bits is replaced with the error checking section at the time when said particular bit is received.

5. The method of claim 4, said error checking section is CRC.

6. An apparatus for transmitting a data frame containing a plurality of information bits, the data frame also containing an error checking section generated based on the information bits and attached at the end of the information bits, the apparatus comprising:
    (a) a processor logic for determining whether alterations are needed to the information bits;
    (b) a first circuit logic for altering a section of the information bits such that subsequent error checking section is forced into a constant bit pattern, if alterations are needed, subsequent to a particular bit of the information bits; and
    (c) a second circuit logic for altering remaining information bits subsequent to said altered section of the information bits into said constant bit pattern.

7. The apparatus of claim 6, said data frame containing a destination address field, wherein said step (a) makes the determination based on said destination address field.

8. The apparatus of claim 6, said data frame containing a source address field, wherein said step (a) makes the determination based on said source address field.

9. The apparatus of claim 6, wherein in said step (b), said section of the information bits is replaced with the error checking section at the time when said particular bit is received.

10. The apparatus of claim 9, said error checking section is CRC.

* * * * *